United States Patent [19]

Naito et al.

[11] Patent Number: 4,645,993
[45] Date of Patent: Feb. 24, 1987

[54] POSITION CONTROL METHOD

[75] Inventors: Akira Naito; Tetsuji Kodama; Hideki Tsuruse; Hironobu Tsutsumi, all of Kanagawa, Japan

[73] Assignee: Mitsubishi Denki Kabushiki Kaisha, Tokyo, Japan

[21] Appl. No.: 710,269

[22] Filed: Mar. 11, 1985

[30] Foreign Application Priority Data

Mar. 9, 1984 [JP] Japan ................... 59-45009

[51] Int. Cl.[4] ............................................ G05B 19/42
[52] U.S. Cl. ..................................... 318/568; 318/640
[58] Field of Search ............ 318/640, 568, 653, 568 D

[56] References Cited

U.S. PATENT DOCUMENTS 3,923,733  1/1976  Olsen et al. ......................... 318/640
4,123,695 10/1978  Hale et al. ....................... 318/640 X
4,146,924  3/1979  Birk et al. ....................... 318/640 X
4,187,051  2/1980  Kirsch et al. ................... 318/640 X
4,325,125  4/1982  Buchfeld ......................... 318/640 X
4,342,090  7/1982  Caccoma et al. ................... 318/640

Primary Examiner—Benjamin Dobeck
Attorney, Agent, or Firm—Sughrue, Mion, Zinn, Macpeak, and Seas

[57] ABSTRACT

A position control method for aligning a workpiece in a machining apparatus. An alignment pattern, such as a diamond, is provided on the surface of the workpiece. The alignment pattern and the surrounding region are sensed by an image pickup television camera, the output of which is converted to binary form. From the binary data, the central point of the pattern is calculated. The difference between this central point and a reference point is then determined, and the result used to control the position of the workpiece via a positioning mechanism.

4 Claims, 5 Drawing Figures

POSITION CONTROL METHOD

BACKGROUND OF THE INVENTION

The present invention relates to a position control method for correctly establishing a position between an object and a machine tool.

When it is desired to automatically machine a workpiece with a machine tool, the conventional approach has been generally to detect the position of the workpiece and to control the machine tool according to the detection result. More specifically, the machine tool is controlled, for example, in such a manner that other parts are mounted or a cutting operation is carried out when the workpiece is moved from a set position a given distance and in a given direction. In this instance, for precisely determining changes in the position of the workpiece, the workpiece is required to be positioned at a central position within the range of detection of a position detector.

FIG. 1 is a schematic block diagram showing a conventional mechanism for detecting the position of workpiece, wherein reference numeral 1 designates a positioning mechanism for holding a workpiece 2, such as a member to be machined, reference numeral 3 designates a mark (as the object to be detected) affixed to the workpiece, for instance, at a central position thereof, and reference numeral 4 indicates a photoelectric tube for detecting the presence of the mark 3.

With this arrangement, the position of the workpiece can only be accurately determined if the mark 3 on the workpiece 2 is readable by the photoelectric tube 4. When the mark 3 is not readable by the photoelectric tube 4, that is, when the workpiece 2 is out of position so that the mark 3 is out of the range of detection of the photoelectric tube 4, the positioning mechanism 1 must be moved, such as by a manually inputted command, to enable the tube 4 to read the mark 3.

Since the conventional apparatus is, however, fabricated as aforementioned, position alignment should be made so that the mark can be read by hand. Further, the photoelectric tube 4 detects no more than the presence or absence of the mark so that the accuracy of the device is limited by size of the mark 3. If the mark is reduced in size so as to improve accuracy, it becomes more difficult for the photoelectric tube to read the mark, thereby requiring much time for position alignment. In contrast, if the mark is increased in size, the result is a reduction in position reading accuracy.

SUMMARY OF THE INVENTION

The invention is provided for eliminating the aforementioned defects.

In accordance with the invention, the image of an object such as a two-dimensional mark or the like is sensed by an image pickup device, and a central point of the object calculated. A positioning mechanism is then controlled to effect the alignment of this central point with a predetermined position of an imaged zone.

DESCRIPTION OF THE PREFERRED EMBODIMENTS

Figure 2:
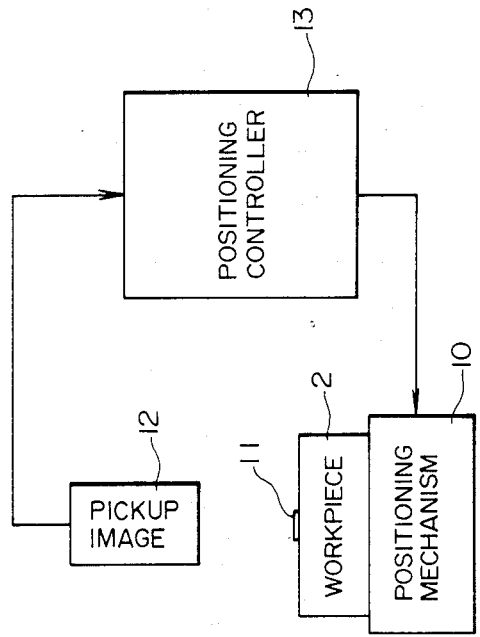
FIG. 2 is a simplified block diagram showing a position control apparatus according to the invention.
Figure 1:
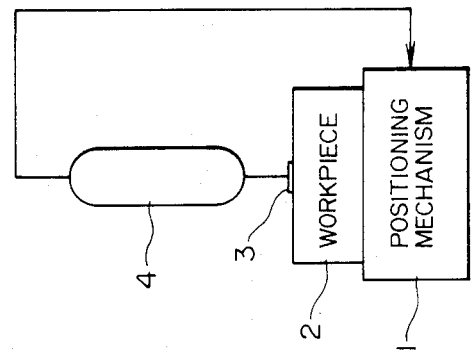
FIG. 1 is a simplified block diagram showing a conventional position control apparatus.

FIG. 2 is a schematic block diagram showing a position control apparatus constructed according to the present invention. As shown in FIG. 2, reference numeral 10 designates a positioning mechanism for holding the member 2, such as a workpiece of the like; 11, a mark (such as a diamond), which is the object to be detected, affixed to the member 2, for example, at a central position thereof; 12, an image pickup device such as a television camera or the like (hereinafter referred to as "television camera") for sensing the image of the mark; and 13, a positioning controller which effects position recognition according to an image pickup signal and, in response thereto, controls the positioning mechanism 10; and 14.

Figure 3:
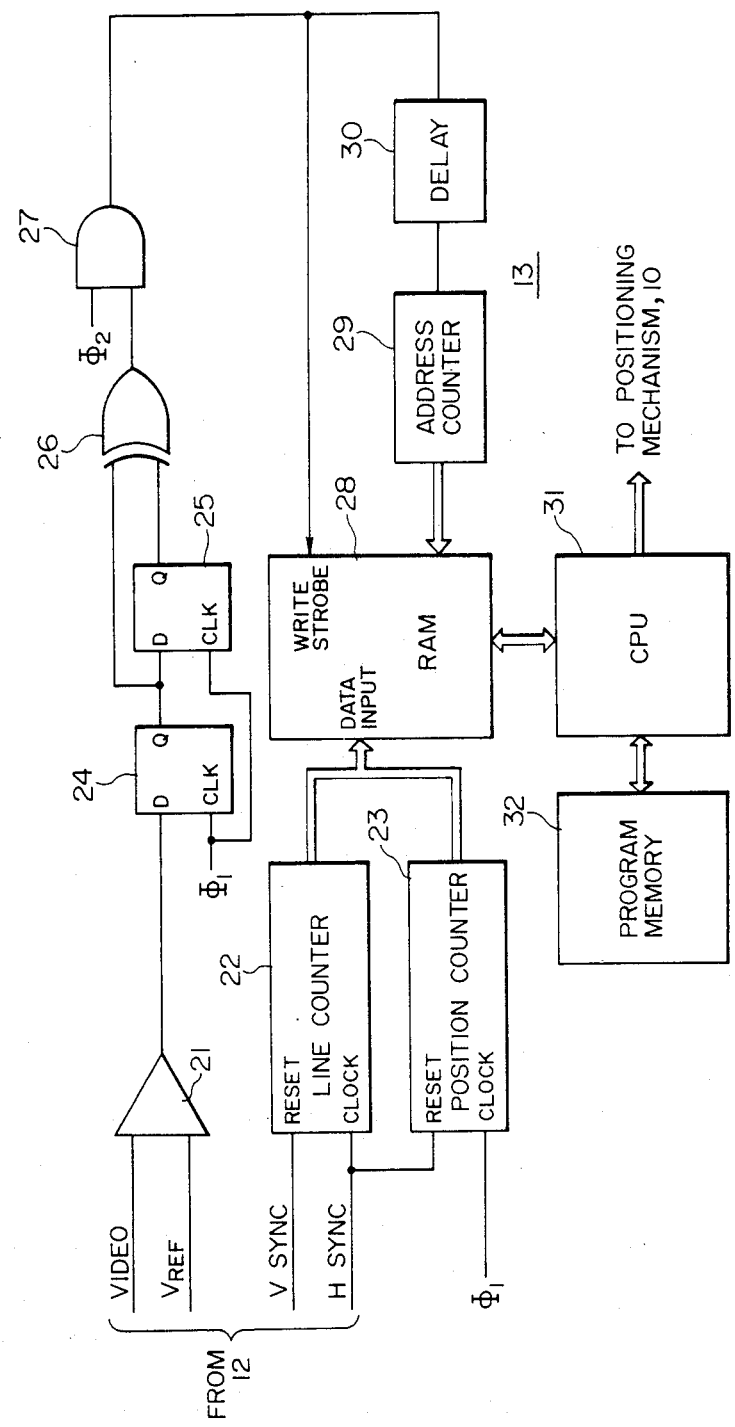
FIG. 3 is a detailed block and schematic diagram of a positioning controller in FIG. 2.

The positioning controller 13 is shown in detail in the diagram of FIG. 3. As shown in FIG. 3, the video output from the television camera 12 is applied to one input terminal of a level comparator 21, to the other input terminal of which is applied a reference voltage $V_{REF}$. The output of the comparator 21 is applied to the D input of a first flip-flop 24, and a second flip-flop 25 receives the Q output of the flip-flop 24 on its D input. The two flip-flops 24 and 25 receive the same clock signal $\phi_1$. The Q outputs of the flip-flops 24 and 25 are applied to respective inputs of an exclusive-OR gate 26. The output of the exclusive-OR gate 26 is coupled to one input of an AND gate 27, the other input of which receives a clock signal $\phi_2$ of the same frequency as the first clock signal $\phi_1$ but of opposite phase.

The vertical synchronizing signal from the television camera 12 is applied to the reset input of a line counter 22, implemented with a binary counter, while the horizontal synchronizing signal is applied to the clock input of the counter 22 and the reset input of a position counter 23, also implemented with a binary counter. The clock input of the counter 23 receives the clock signal $\phi_1$. The output lines of the counters 22 and 23 are coupled to respective data input bits of a random access memory 28. The output of the AND gate 27 forms the write strobe input to the memory 28. The output of the AND gate 27 is also applied through a delay circuit to the clock input of an address counter 29.

The bus of a CPU (Central Processing Unit) 31 is also coupled to the memory 28 so that the CPU can read data out of the memory. This may be done by employing a dual-port type memory, or by connecting the data bus of the CPU 31 to the data port of the memory commonly with the outputs of the counters 22 and 23 and the address bus of the CPU to the address port of the memory commonly with the address counter 29 through multiplexers. A program memory 32 is provided for the CPU 31.

Figure 5:
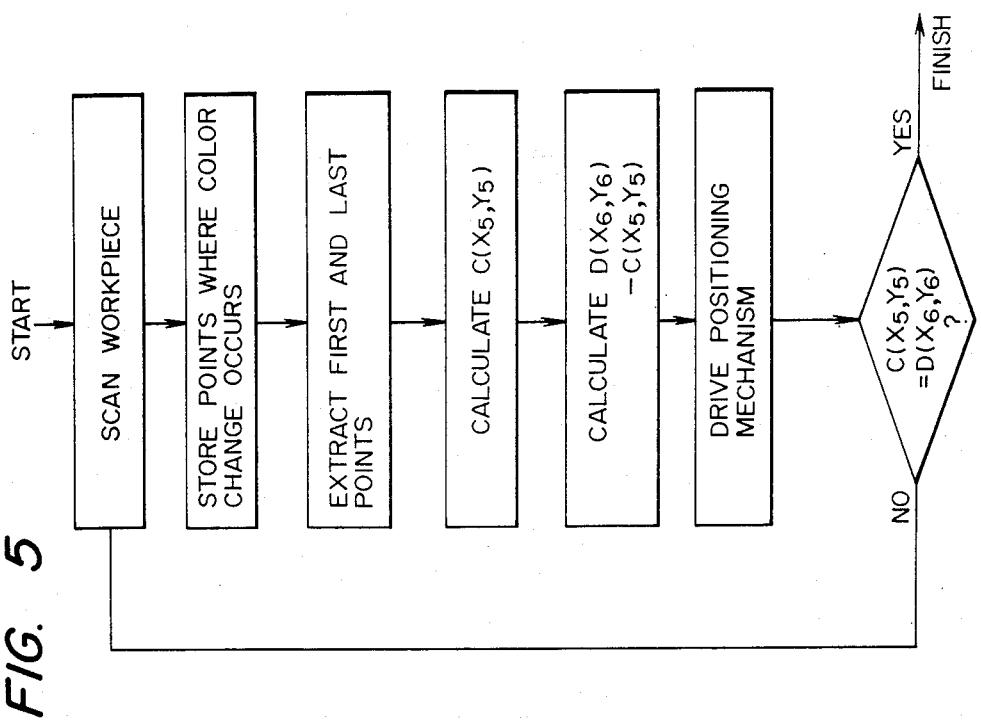
FIG. 5 is a flow chart describing the operation of the positioning controller of FIG. 2.
Figure 4:
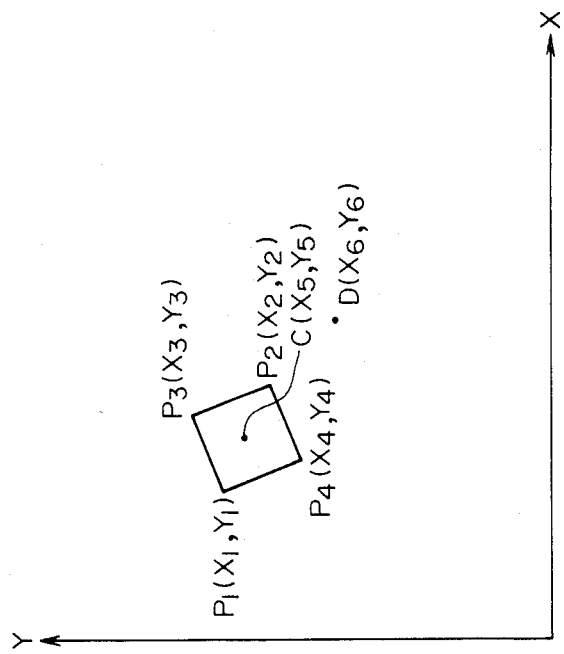
FIG. 4 is a diagram used to illustrate the calculation of a center point of a two-dimensional mark.

With reference to FIG. 3 and the diagram of FIGS. 4 and 5, the operation of the apparatus of the invention will now be explained. A mark 11 such as a black diamond as shown in FIG. 4 is placed on the workpiece, preferably on a white or light-colored background. As the mark 11 is scanned, a video signal is generated by the television camera 12 which varies in level between a level representing white and a level representing black. By choosing $V_{REF}$ between these two levels, the output of the comparator is indicative of whether the television camera is presently scanning a white or black area. This data is continuous read into the flip-flop 24 with the clock $\phi_1$, which has a frequency determined by the desired accuracy of the position measurement of the mark. The output of the flop-flop 24 is clocked into the flop-flop 25 with a delay of one clock period. When a boundary between a white and black area is being crossed, after one clock pulse, the outputs of the two flip-flop will be in different states. At such times and only at such times, the output of the exclusive-OR gate becomes H (high level, or logical "1"), thereby allowing the next pulse of the clock signal $\phi_2$ to pass through the AND gate 27.

The counter 22 is incremented by a count of one for each scanning line, while the counter 23 is reset at the beginning of each scanning line and is incremented continuously along each scanning line. Therefore, taken together, the outputs of the two counters are indicative of the current scanning position within the scanning field. When a pulse (write strobe) passes the AND gate 27 at the time a boundary between white and black is crossed, the current count outputs of the counters 22 and 23 are stored in the memory 28. Thus, data indicative of the boundaries of the mark 11 are stored in the memory 28.

Once the above operations have been completed, the CPU takes over the operation. Specifically, the CPU first determines at least two of the end point of the mark on opposite corners. This may be done in several ways. One way is to simply note the addresses produced by the counter at the times the first and last points stored in the memory are received. These will be the first address employed and the last address remaining in the address counter. Another way is to read out and compare all of the data stored in the memory. If, with reference to FIG. 4, the mark 11 and surrounding area are scanned with scanning lines parallel to the X axis, the data so extracted will represent the points P3 and P4.

The CPU 31 next calculates the center point C (X5,Y5) by the simple calculations:

$$X5 = (X3 - X4)/2 + X4. \text{ and}$$

$$Y5 = (Y3 - Y4)/2 + Y4.$$

Following this, the CPU calculates the X and Y distances $\Delta X$ and $\Delta Y$ between the point C and the point D with which the point C should be aligned as:

$$\Delta X = X6 - X5, \text{ and}$$

$$\Delta Y = Y6 - Y5.$$

The values $\Delta X$ and $\Delta Y$ are applied to the positioning mechanism as control values. The process is repeated until the workpiece is properly positioned.

To improve the accuracy and reliability of the above-described process, it is preferred that the mark be scanned twice, in orthogonal directions. In this case, all of P1 through P4 are derived. Then, using simple geometric calculations, equations of the two lines joining the opposite corners of the mark are determined and the center point C calculated as the point of intersection of the two lines.

It is noted that the instant apparatus is considered to have obtained the appropriate data when the results of two sequential measurements correspond to each other. This avoids malfunctions derived from noise in the optical system or the like. Such measurements may be repeated if the results do not correspond to each other. This measurement may be repeated, for instance, four times at the maximum.

It is noted that the object 11 to be detected is not limited to a diamond shape but may take any other configuration. Moreover, the workpiece itself may be used as the object to be detected.

As set forth hereinbefore, according to the invention, an object such as a mark or the like to be detected is sensed by an image pickup device, the central position of the object is determined, a deviation of the central position from a reference position determined, and a positioning mechanism controlled so as to cause the two positions to coincide. Accordingly, highly accurate position alignment is automatically and quickly achieved.

We claim:

1. A position control method, comprising the steps of: providing a two-dimensional mark on an object to be positioned; scanning said mark and an adjacent area with a television camera; extracting from an output of said television camera positions of corners of said mark; calculating a center point of said mark from said positions of said corners; calculating an amount of deviation of said center point from a reference point; and correcting a position of said object by an amount of said deviation.

2. The position control method of claim 1, wherein said step of extracting said positions of said corners comprises determining points along a boundary of said mark from transitions in a video output signal of said television camera.

3. The position control method of claim 2, wherein said step of extracting said positions of said corners comprises determining end ones of said points along said boundary.

4. The position control method of claim 1, further comprising the step of storing from said output of said video camera only said points along said boundary.

* * * * *